United States Patent [19]
Frerichs et al.

[11] Patent Number: 4,825,924
[45] Date of Patent: May 2, 1989

[54] BEAD CORE FOR A PNEUMATIC VEHICLE TIRE INCLUDING HOLLOW CORDS

[75] Inventors: Udo Frerichs, Langenhagen; Heinz-Dieter Rach, Garbsen, both of Fed. Rep. of Germany

[73] Assignee: Continental Aktiengesellschaft, Hanover, Fed. Rep. of Germany

[21] Appl. No.: 8,576

[22] Filed: Jan. 29, 1987

[30] Foreign Application Priority Data

Jan. 31, 1986 [DE] Fed. Rep. of Germany ....... 3602873

[51] Int. Cl.$^4$ ............................................. B60C 15/04
[52] U.S. Cl. .................................... 152/540; 152/544; 152/DIG. 20
[58] Field of Search ............... 152/539, 540, 544, 451, 152/379.3, 379.4, 379.5, 380, 381.3, 387, DIG. 20; 245/1.5; 156/136, 460, 422; 57/902

[56] References Cited

U.S. PATENT DOCUMENTS

| | | | |
|---|---|---|---|
| 3,736,974 | 6/1973 | Lejeune | 152/544 |
| 3,867,973 | 2/1975 | Cozzolino et al. | 152/539 X |
| 4,237,954 | 12/1980 | Pommier | 152/540 |
| 4,597,426 | 7/1986 | Mauk et al. | 152/379.5 |

FOREIGN PATENT DOCUMENTS

| | | | |
|---|---|---|---|
| 0146715 | 7/1985 | European Pat. Off. | 152/539 |
| 3000428 | 7/1981 | Fed. Rep. of Germany | |
| 3246624 | 6/1984 | Fed. Rep. of Germany | |
| 3440440 | 5/1986 | Fed. Rep. of Germany | 152/539 |

Primary Examiner—Michael W. Ball
Assistant Examiner—Geoffrey L. Knable
Attorney, Agent, or Firm—Becker & Becker, Inc.

[57] ABSTRACT

A bead core for a pneumatic vehicle tire that is designed to have its beads disposed on the radially inner periphery of a rim. The bead core is in the form of an endless ring that has an essentially round cross-sectional shape. To increase the bead-seating reliability, it is proposed that the inner core of the bead core be hollow or be formed by a lightweight ring that serves as a spacer element. At least one layer of load-carrying cords is disposed about the inner core. These load-carrying cords have a solid cross-sectional area or a hollow cross-sectional shape.

9 Claims, 5 Drawing Sheets

BEAD CORE FOR A PNEUMATIC VEHICLE TIRE INCLUDING HOLLOW CORDS

BACKGROUND OF THE INVENTION

1. Field of the Invention

The present invention relates to a bead core for a pneumatic vehicle tire that is designed to have its beads disposed on the radially inner periphery of a rim. The bead core is in the form of an endless ring that has an essentially round cross-sectional shape.

2. Description of the Prior Art

A vehicle tire having such a round bead core is described, for example, in German Offenlegungsschrift No. 30 00 428 Rach et al dated July 9, 1981 and belonging to the assignee of the present invention. In contrast to the tires predominantly used these days, with a tire of this type the bead cores are subjected to only slight tensile stress, and to a great amount of compression. This was not taken into consideration in the tire disclosed in German Offenlegungsschrift No. 30 00 428 Rach et al dated July 9, 1981. A further problem frequently arises with vehicle wheel and tire assemblies where the tire beads are disposed on the radially inner periphery of the rim; the tire beads must be pivotable relative to the bead cores so that the tires can be mounted on a one-piece rim. This problem was considered in detail in German Offenlegungsschrift No. 32 44 046 Mauk et al corresponding to U.S. Pat. No. 4,597,426-Mauk et al issued July 1, 1986 belonging to the assignee of the present invention and in German Offenlegungsschrift 32 46 624 Frerichs et al dated June 20, 1984 belonging to the assignee of the present invention. And in German Offenlegungsschrift No. 34 40 440.6 Brunke dated May 7, 1986, it was proposed to interconnect the wires of the outer layer of a bead core ring by soldering them in order in this manner to achieve a high reliability during compression of the tire bead.

It is an object of the present invention to provide a bead core ring that can further optimize a vehicle tire, and in particular can increase the resistance to bending and can reduce the weight, while maintaining or even improving the bead seating reliability that has already been achieved.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The bead core of the present invention is characterized primarily in that the inner core of the bead core is hollow or is formed from a lightweight ring that serves as a spacer element, and in that at least one layer of load-carrying cords is disposed about the inner core, with these load-carrying cords having a solid cross-sectional area or a hollow cross-sectional shape.

It is a further object of the present invention, with a tire having a rotating bead, to avoid build-up of material in the circumferential direction of the tire, with such material build-up being caused by a relative movement between the material of the bead and the bead core ring, and occurring predominantly during mounting of the tire. To resolve this problem, it is proposed that the bead core have spaced-apart elevations or grooves on the outer surface of the bead core ring, with these elevations or grooves extending in planes that are disposed at right angles to the circumferential direction of the core ring. The elevations or grooves mesh with complementary grooves or elevations in the tire bead, with the bead core being embedded in the tire bead in a non-adhering manner.

The present invention is based primarily upon the recognition that the tire under consideration, rather than requiring a high tensile strength for the bead cores, require a high resistance to bending. Therefore, the inventive bead cores are built-up of elements that have a reduced tensile strength, having instead a considerably increased resistance to bending. Such elements are primarily tubular load-carrying cords, and are preferably made of metal. Furthermore, the majority of the inventive bead core is disposed at a relatively great distance from the center point of the cross-sectional area of the bead core, so that very great moments of inertia result. With this viewpoint in mind, it is advantageous to increase the diameter of the cross-sectional area of the core with respect to heretofore known bead cores. The advantage of a considerable reduction in weight for the bead core ring is achieved due to the fact that the relatively thick inner core of the bead core has a large hollow interior or is formed by a lightweight ring that serves as a spacer element and that can be made, for example, of hard foam.

The inventive bead core can be embedded in the bead of a tire in such a way that a pivoting of at least 90° of the tire bead about the inner core of the bead core is possible.

Further specific features of the present invention will be described in detail subsequently.

DESCRIPTION OF PREFERRED EMBODIMENTS

Figure 1:
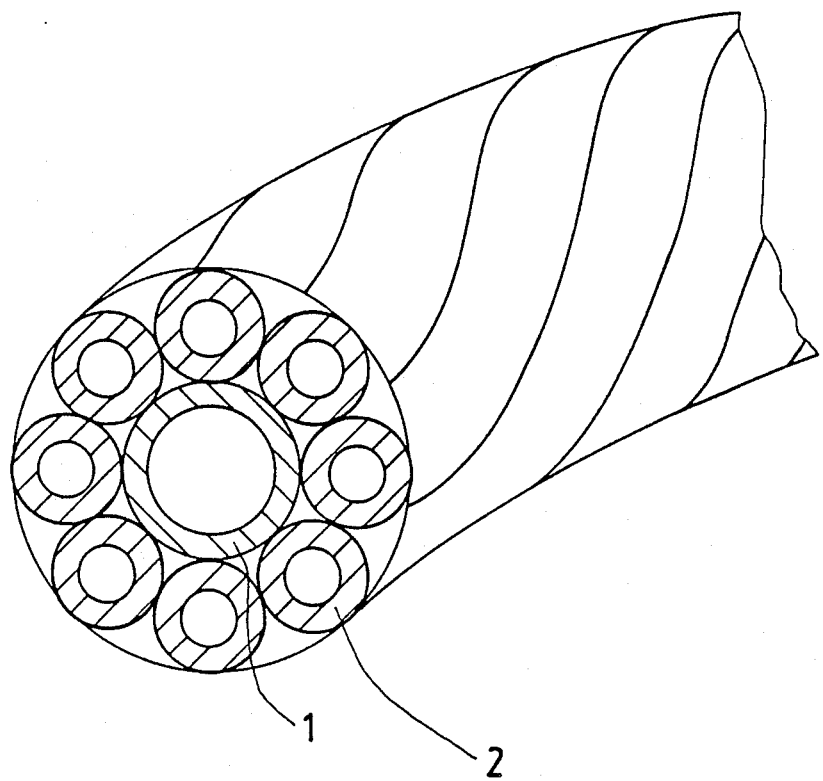
FIG. 1 is a partial perspective and cross-sectional view of one exemplary embodiment of the inventive bead core ring with a hollow inner core and a single layer of hollow load-carrying cords.

Referring now to the drawings in detail, the bead core ring illustrated in FIG. 1 essentially comprises a tubular inner core 1 and similarly tubular load-carrying cores 2 that surround the inner core 1 in a single layer. The hollow load-carrying cords 2 are twisted about the inner core 1 in such a way that along the peripheral length of the overall bead core ring, the load-carrying cords 2 form four to ten lengths of twist. The inner core 1 can be hollow, or can also be filled with a lightweight filler. In order to achieve high moments of inertia, the diameter of the inner core 1 should be considerably greater than the diameter of the individual load-carrying cords 2. The load-carrying cords 2 can either all be of the same thickness, or can have different thicknesses. The inner core 1 and the load-carrying cords 2 are preferably made of metal, such as steel. However, if necessary, they could also be made of other materials, such as glass fiber material or other compression-resistant synthetic materials. In the embodiment illustrated in FIG. 1, the layer that surrounds the inner core 1 is formed by eight load-carrying cords 2; however, it would, of course, also be possible to use a different number of cords 2.

Figure 2:
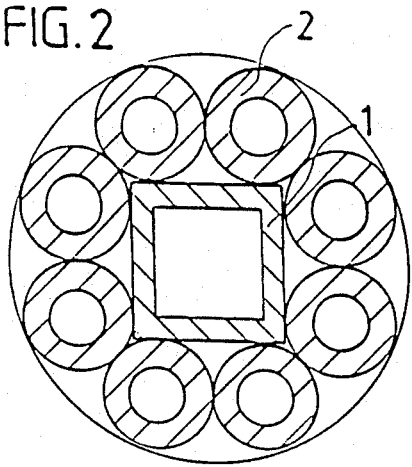
FIG. 2 is a partial radial cross-sectional view of an exemplary inventive embodiment of a bead core having a square inner core.

The bead core of FIG. 2 differs from that of FIG. 1 merely in that an inner core 1 having a square cross-sectional shape is provided in place of the round inner core 1.

Figure 3:
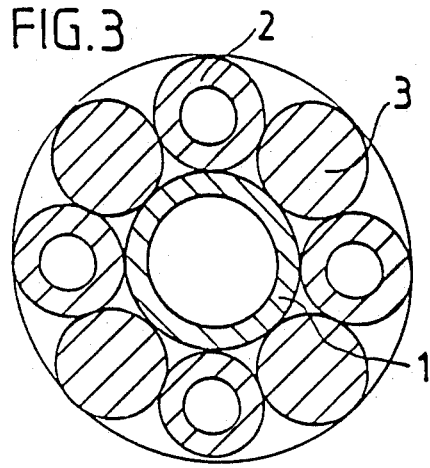
FIG. 3 is a partial radial cross-sectional view of an exemplary inventive embodiment of a bead core where the load-carrying cords in the outer layer alternate between a hollow cross-sectional shape and a solid cross-sectional area.

In the embodiment of FIG. 3, an inner core 1 of the type used in FIG. 1 is used, while the layer of load-carrying cords that surrounds the inner core 1 comprises hollow load-carrying cords 2 and load-carrying cords 3 that have a solid cross-sectional area.

Figure 4:
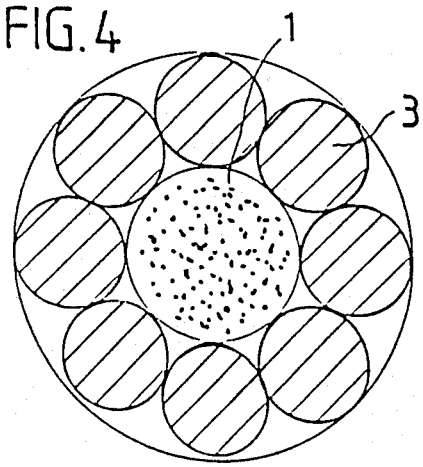
FIG. 4 is a partial radial cross-sectional view of an exemplary embodiment of the inventive bead core where the inner core is formed by a hard foam ring.
Figure 5:
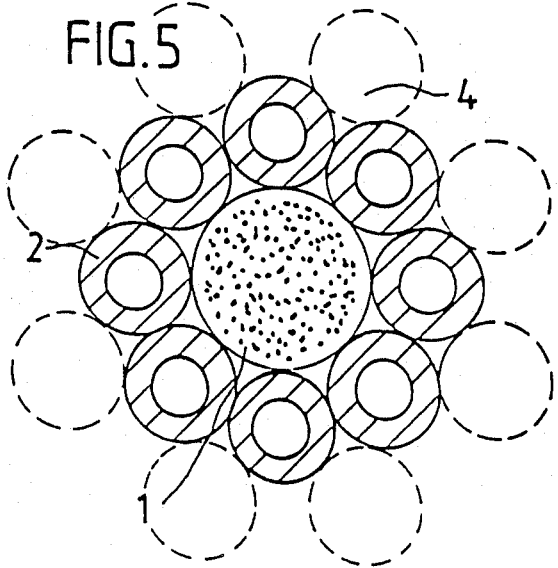
FIG. 5 is a partial radial cross-sectional view of an exemplary embodiment of the inventive bead core where, in contrast to the embodiment of FIG. 4, the load-carrying cords in the layer adjacent to the inner core have a hollow cross-sectional shape.

FIG. 4 illustrates a bead core where the inner core 1 is formed from a ring that serves merely as a spacer element; this ring can be made, for example, of hard foam material. Load-carrying cords 3 having a solid cross-sectional area are disposed about the inner core 1 in a single layer. The embodiment of FIG. 5 differs from that of FIG. 4 merely in that hollow load-carrying cords 2 are disposed about the inner core ring 1. The dashed-line circles 4 indicate the principle that more than one layer of load-carrying cords 2, 3 could be disposed about the inner core 1. This principle is, of course, also applicable to the other embodiments.

Figure 6:
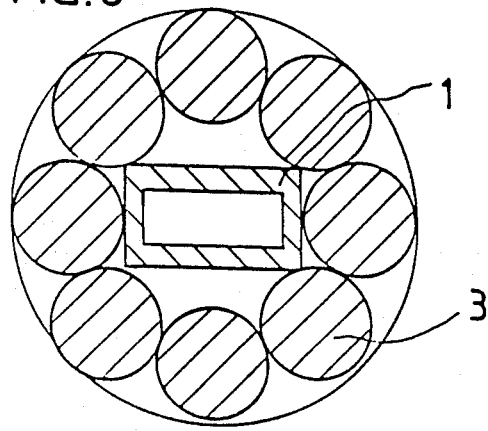
FIG. 6 is a partial radial cross-sectional view of an exemplary embodiment of the inventive bead core where the inner core is formed by a rectangular hollow profiled member.

FIG. 6 shows a bead core where the inner core 1 is formed by a rectangular, hollow profiled member, while the load-carrying cords 3 that are disposed in a single layer about the inner core 1 have a solid cross-sectional area. Depending upon actual requirements, the rectangle that forms the inner core 1 can be disposed horizontally or upright in the bead core ring.

Figure 7:
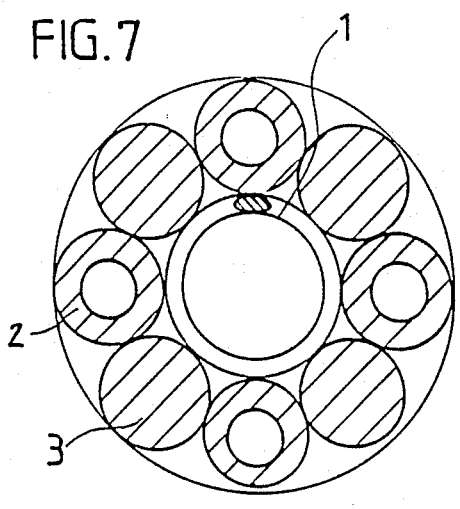
FIG. 7 is a partial radial cross-sectional view of an exemplary embodiment of the inventive bead core where the inner core is formed by a helically wound load-carrying cord.
Figure 8:
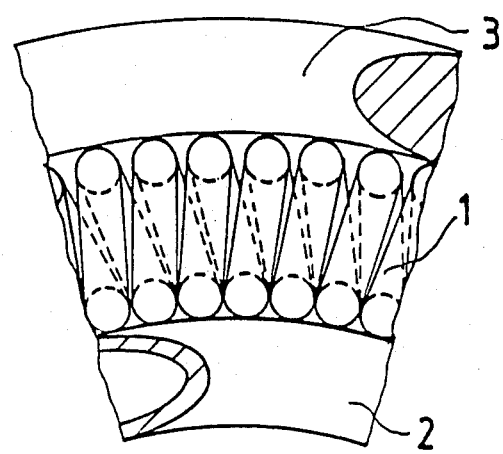
FIG. 8 is a partial cross-sectional view of the bead core of FIG. 7 taken at right angles to the axis of rotation of the core ring.

FIGS. 7 and 8 illustrate a bead core ring where the inner core 1 comprises a helically wound load-carrying cord, with the coils thereof being disposed next to one another in the circumferential direction of the bead core ring so that the inner core 1 again has a hollow interior, a relatively large diameter, and serves as a spacer for the load-carrying cords 2 and 3. The hollow and solid load-carrying cords 2, 3 are again wound about the inner core 1 in such a way as to have four to ten twists.

Figure 9:
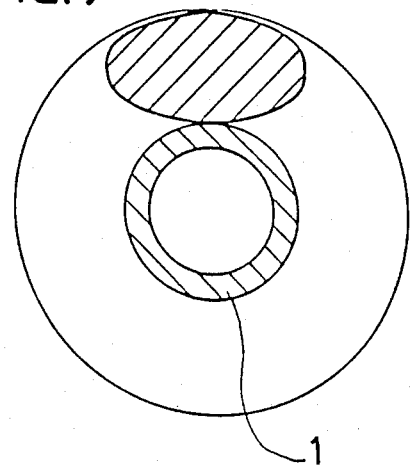
FIG. 9 is partial radial cross-sectional view of an exemplary embodiment of the inventive bead core with a tubular inner core and a single layer of a helically wound load-carrying cord.
Figure 10:
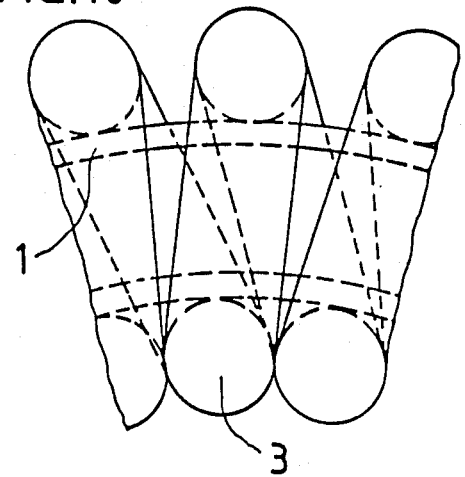
FIG. 10 is a side view of the bead core of FIG. 9 taken at right angles to the axis of rotation of the core ring.

In the bead core ring of FIGS. 9 and 10, the inner core 1 comprises a tubular load-carrier, for example of the type illustrated in FIG. 1. In the adjacent layer, a load-carrying cord 3 having a solid cross-sectional area is helically wound about the inner core 1. The individual coils rest against one another, at least on the radially inner side of the bead core ring. A bead core ring of this type is particularly suitable for avoiding the compression or build-up of material in the bead region during mounting of the tire.

Figure 11:
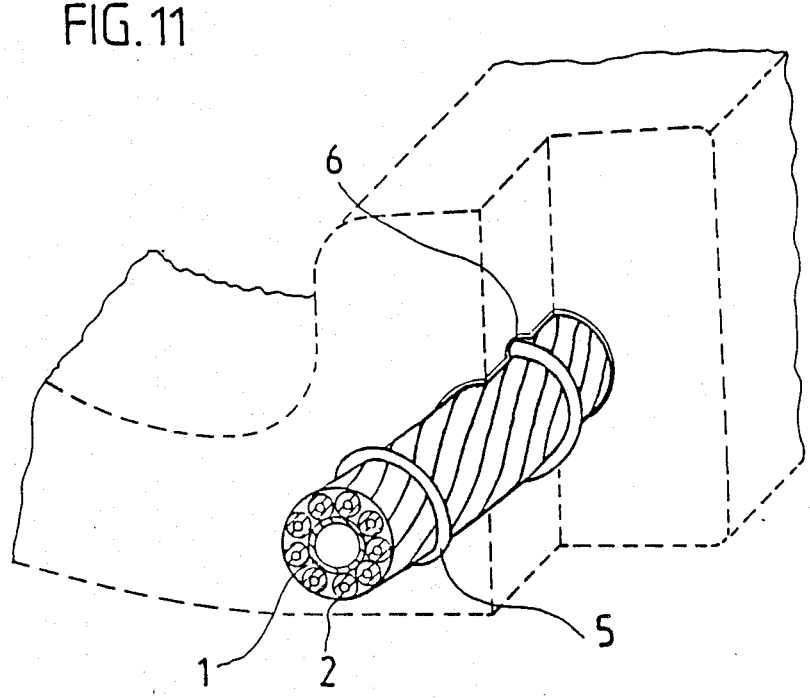
FIG. 11 is a partial perspective view of an exemplary embodiment of the inventive bead core ring having elevations or raised portions that extend transversely on the surface of the ring.

The embodiment illustrated in FIG. 11 also serves to avoid such build-up of material in the bead region. Disposed on the outer surface of a bead core ring of the type described in FIG. 1 are spaced-apart elevations or raised portions 5 that extend in planes perpendicular to the circumferential direction of the core ring, and that mesh with complementary grooves 6 in the tire bead. The bead core, in a manner known per se, is embedded in the tire bead in a non-adhering manner. As a result of these measures, there is achieved a pivotability of the tire bead about the bead core ring. However, a relative movement of the tire bead to the bead core ring in the circumferential direction of the latter is avoided. The same effect can, of course, can be achieved by providing the grooves on the bead core ring and the elevations on the tire bead.

Figure 12:
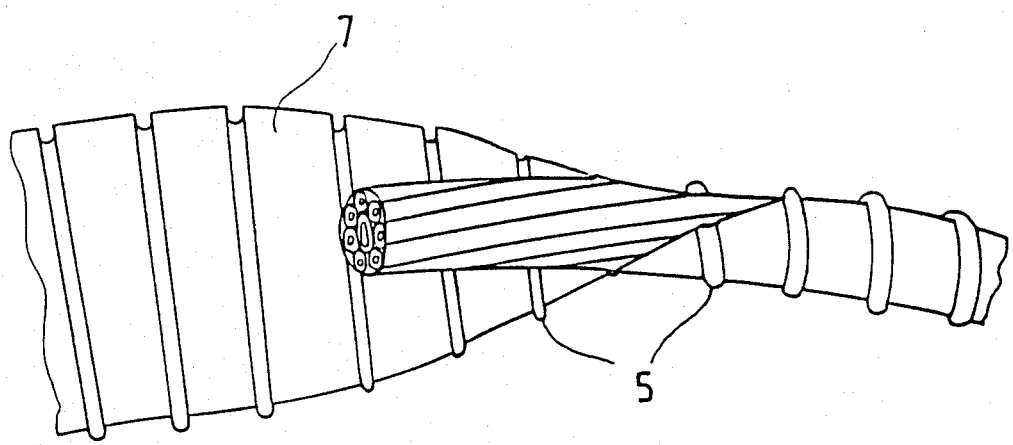
FIG. 12 is a partial perspective view of an exemplary embodiment of the inventive bead core ring where the elevations or raised portions are disposed on a sheet of material.

FIG. 12 shows a further possibility for solving this problem. In this case, a bead core of the type illustrated in FIG. 1 has wrapped around it a sheet of material 7 that is provided with elevations or raised portions 5. The material 7 can comprise metal, rubber, or synthetic material, and can be secured to the bead core by being vulcanized or otherwise adhered thereto. In order to avoid possible build-ups in the circumferential direction of the bead core ring, a metal foil is particularly suitable for the material 7 due to its great compressive rigidity.

Figure 13:
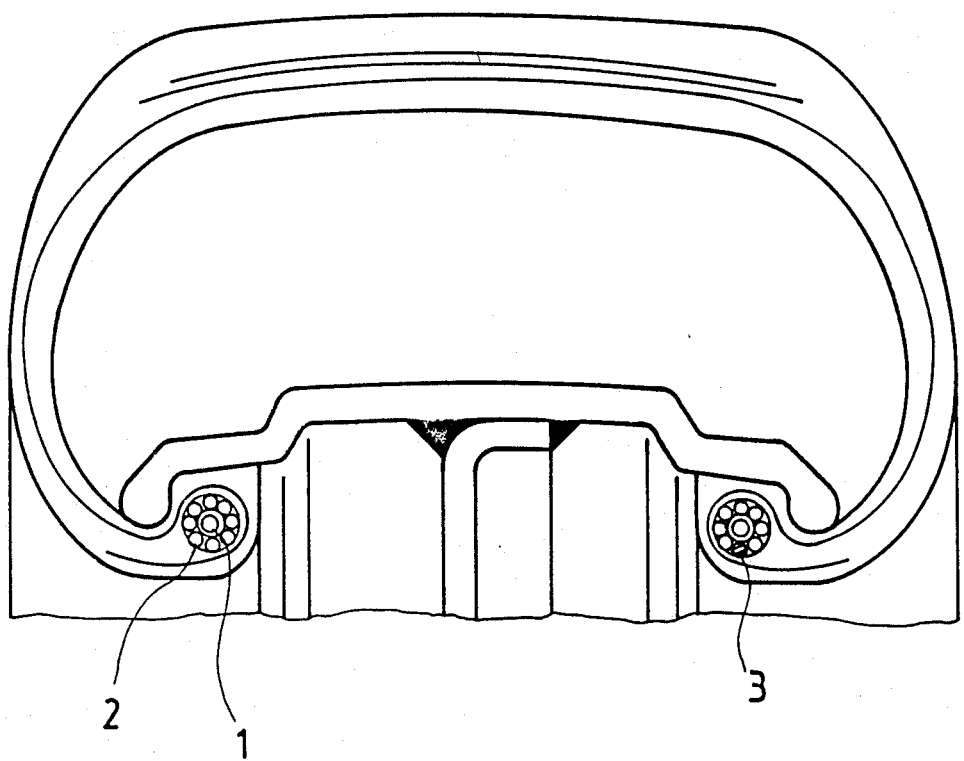
FIG. 13 is a view that shows a vehicle wheel and tire assembly where the tire beads are provided with bead cores of the type illustrated in FIG. 1.

FIG. 13 illustrates a vehicle wheel and tire assembly of the type described in detail, for example, in German Offenlegungsschrift No. 30 00 428 Rach et al dated July 9, 1981 belonging to the assignee of the present invention. However, the assembly illustrated in FIG. 13 differs from that of the cited reference in that the former is provided with the inventive bead core rings. In this way, the bead seating reliability is increased, the resistance of the bead core rings to bending is increased, and the weight of the overall assembly is considerably reduced.

The present invention is, of course, in no way restricted to the specific disclosure of the specification and drawings, but also encompasses any modifications within the scope of the appended claims.

What we claim is:

1. A bead core for a pneumatic vehicle tire that is designed to have its beads disposed on the radially inner periphery of a wheel rim, with said bead core being in the overall form of an endless ring that has an essentially round cross-sectional shape; said bead core comprises:

an essentially annular-shaped inner core having an essentially round cross-sectional shape; and at least one layer of load-carrying cord means disposed about said inner core, said load-carrying cord means comprising hollow load-carrying cords which are essentially round in cross-sectional shape and have a diameter in cross-section that is less than the diameter in cross-section of said inner core.

2. A bead core according to claim 1, in which said inner core is in the form of a round, tubular ring.

3. A bead core according to claim 1, in which said inner core comprises an interior lightweight foam filler inner core ring that serves merely as a spacer element.

4. A bead core according to claim 3, in which said inner core ring is made of a hard foam material.

5. A bead core according to claim 1, in which said inner core is formed by a helically wound load-carrier having coils which are twisted about longitudinal axis thereof and essentially rest against one another only at radially inner side of the bead core; and in which said load-carrying cord means comprises loadcarrying cords that essentially extend twisted in the circumferential direction of said bead core ring.

6. A pneumatic vehicle tire having a bead core according to claim 1 embedded in a tire bead so that it is possible for said bead to pivot about said inner core of said bead core by at least 90°.

7. A bead core according to claim 1, in which said inner core and said load-carrying cord means are made of materials selected from the group consisting of steel, other metals, glass fiber material, and synthetic materials.

8. A bead core for a pneumatic vehicle tire that is designed to have its beads disposed on the radially inner periphery of a wheel rim, with said bead core being in the overall form of an endless ring that has an essentially round cross-sectional shape; said bead core comprises:

an essentially annular-shaped inner core; and at least one layer of load-carrying cord means disposed about said inner core including a single layer of load-carrying cord means in the form of load-carrying cords also round in cross-sectional shape that alternately have a solid cross-sectional area and a hollow cross-sectional shape.

9. A bead core according to claim 8, in which said inner core and said load-carrying cord means are made of materials selected from the group consisting of steel, other metals, glass fiber material and synthetic materials.

* * * * *